May 12, 1959

S. S. LANIER, JR 2,886,167

CONVEYING APPARATUS

Filed Oct. 26, 1956

INVENTOR.
Sterling S. Lanier Jr.
BY
Jennings, Carter & Thompson
Attorneys

May 12, 1959  S. S. LANIER, JR  2,886,167
CONVEYING APPARATUS
Filed Oct. 26, 1956  9 Sheets-Sheet 3

INVENTOR.
Sterling S. Lanier Jr.
BY
Jennings, Carter + Thompson
Attorneys May 12, 1959     S. S. LANIER, JR     2,886,167
CONVEYING APPARATUS

Filed Oct. 26, 1956     9 Sheets-Sheet 6

INVENTOR.
Sterling S. Lanier Jr.
BY
Jennings, Carter + Thompson
Attorneys

May 12, 1959   S. S. LANIER, JR   2,886,167
CONVEYING APPARATUS
Filed Oct. 26, 1956   9 Sheets-Sheet 8

INVENTOR.
Sterling S. Lanier Jr.
BY
Jennings, Carter & Thompson
Attorneys

United States Patent Office 2,886,167
Patented May 12, 1959

2,886,167

CONVEYING APPARATUS

Sterling S. Lanier, Jr., Nortonville, Ky., assignor of small percentages to various assignees Application October 26, 1956, Serial No. 618,564

14 Claims. (Cl. 198—109)

This invention relates to conveying apparatus and more particularly to a mobile conveyor which shall be adapted for conveying around curves.

Another object of my invention is to provide a rail supported conveyor belt having mobile supports and automatic take-up means for the rails, whereby the rails are adapted to expand or contract as they bend around curves whereby the belt is supported for conveying around curves successively in either direction.

A further object of my invention is to provide a mobile conveyor of the character designated which shall include means permitting relative vertical movement of the mobile supporting means for the rails, whereby the conveyor is adapted for conveying over irregular vertical curves.

A further object of my invention is to provide conveying apparatus of the character designated which shall be adapted for use with either a dual rail system or a mono-rail system.

A further object of my invention is to provide conveying apparatus of the character designated in which the supporting rail may be in the form of a rod or a wire rope.

A still further object of my invention is to provide conveying apparatus which shall be simple of construction and operation and which shall reduce greatly the cost of installation and operation of relatively long conveyors, such as are used in coal mines and the like.

Heretofore in the art to which my invention relates, difficulties have been encountered in operating mobile conveyors in mines and the like due to the fact that mobile conveyors heretofore employed will not convey around curves without being coupled together in a series of short units or without the provision of anchored guide members for directing the conveyor around the curve. Also, difficulties have been encountered in conveying materials in conveyor belts over relatively steep inclines due to the fact that the material tends to shift within the belt. So far as I am aware there is no single drive mobile conveyor unit which will convey satisfactorily large volume materials, such as coal, around successively encountered curves. I overcome these and other difficulties by providing a compact, mobile belt conveyor in which the belt and supporting means for the conveyor travel around curves whenever encountered in either direction without the necessity of guides and the like other than those serving as supporting rails. The conveying flight of the conveyor assumes a substantially cylindrical shape as the material is conveyed therein, thereby preventing the material from shifting within the conveyor as it passes over steep inclines.

Briefly, my improved conveying apparatus comprises an endless conveyor belt having a head terminal at one end and a tail terminal at the other end thereof around which the belt passes. Supporting sheaves are attached at intervals at each side of the belt and ride upon supporting guide rails which may be in the form of flexible rods or wire ropes that extend between the head terminal and the tail terminal. To prevent undue stretching of the belt edges, flexible members, such as chains or flexible rods, are attached to the edges of the belt. Mobile support units are provided at intervals along the guide rails for supporting the same and are connected to each other by flexible draw bars which are adapted to bend in horizontal planes relative to each other and are provided with a hinged take-up at intervals to permit vertical adjustment of adjacent draw bars, thus permitting the support units to follow in tandem. Track engaging frames are attached to the draw bars intermediate the support units to assure that the rails bend in parallel arcs when the conveyor travels around a curve. The supporting rails are formed of a plurality of sections of flexible rods or wire ropes which are joined to each other by adjustable connectors whereby the rails are automatically shortened or lengthened to convey around a curve in either direction. In a modified form of my invention, the supporting guide members are in the form of overlapped plates which are supported by the mobile support units. The material is conveyed over the plates by a flexible drag member.

Apparatus embodying features of my invention is illustrated in the accompanying drawings, forming a part of this application, in which.

Figure 1:
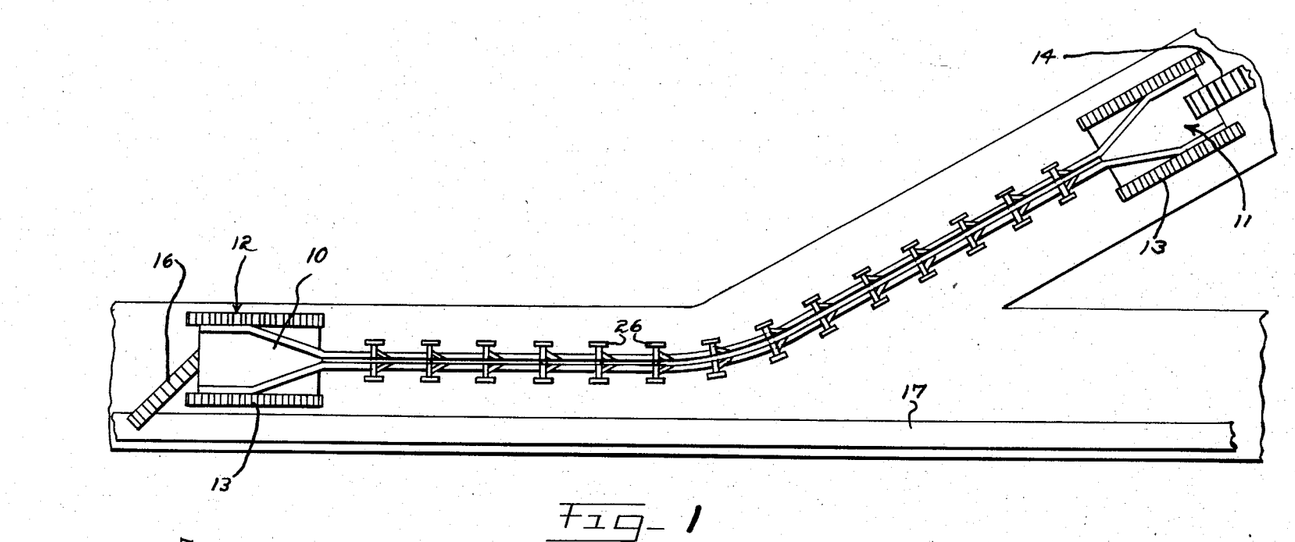
Fig. 1 is a diagrammatic plan view, partly broken away, showing the apparatus in operation.
Figure 2:
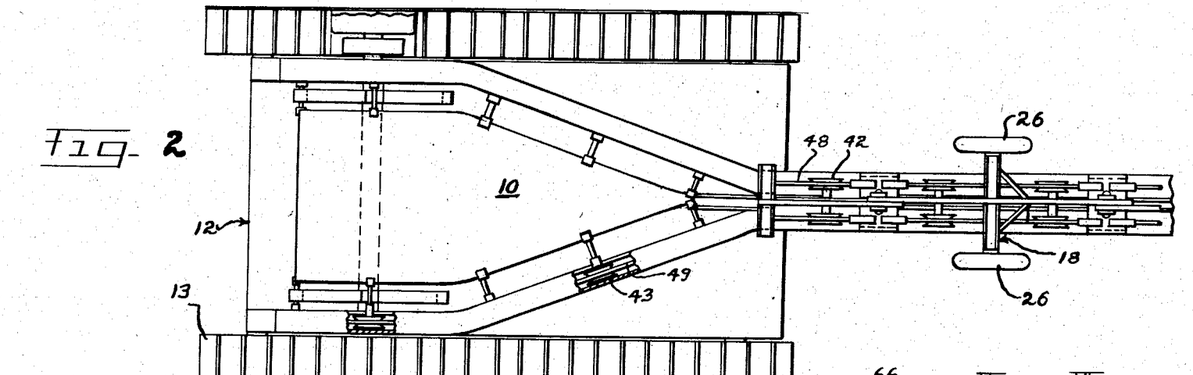
Fig. 2 is a plan view, partly broken away and in section, showing the discharge end of the conveyor.
Figure 3:
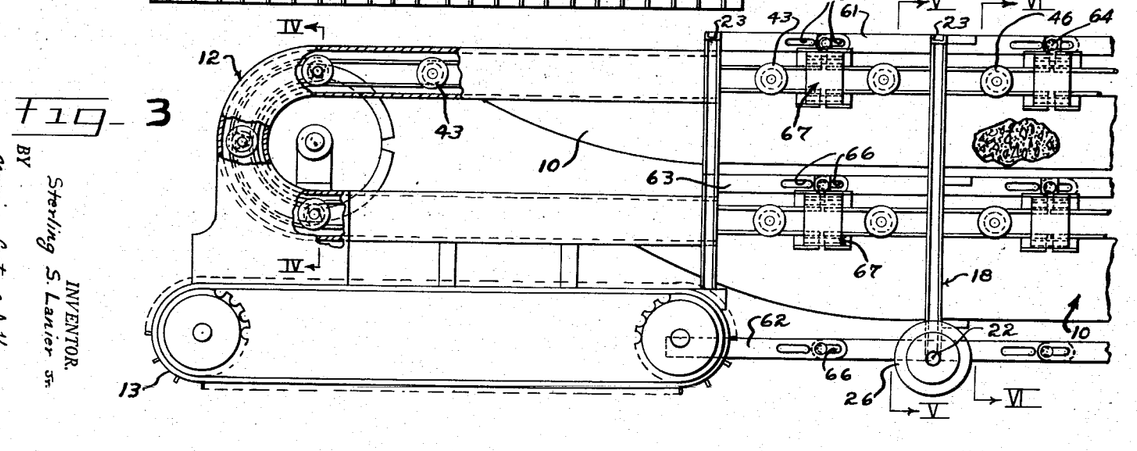
Fig. 3 is a side elevational view of the discharge end of the conveyor, partly broken away and in section.

Referring now to the drawings for a better understanding of my invention, I show an endless conveyor belt 10 which passes around head and tail terminals indicated generally at 11 and 12, respectively. As shown in Figs. 1, 2 and 3, the head and tail terminals 11 and 12 are supported by any suitable means, such as track supported vehicles 13. The head terminal 11 may be associated with a conventional type loader indicated at 14 and the tail terminal 12 may be associated with a suitable short conveyor 16 which transfers the material being conveyed onto a main conveyor indicated generally at 17.

The conveyor belt 10 is supported intermediate the head and tail terminals 11 and 12 by a plurality of mobile frame units indicated generally at 18. Each frame unit 18 embodies upstanding frame members 19 and 21 which are mounted on supporting axles 22 and are cross braced by transverse members 23, 24 and 25. Mounted for rotation on the axle 22 are supporting wheels 26, which are preferably of the pneumatic type.

Figures 5, 7, 8, 9:
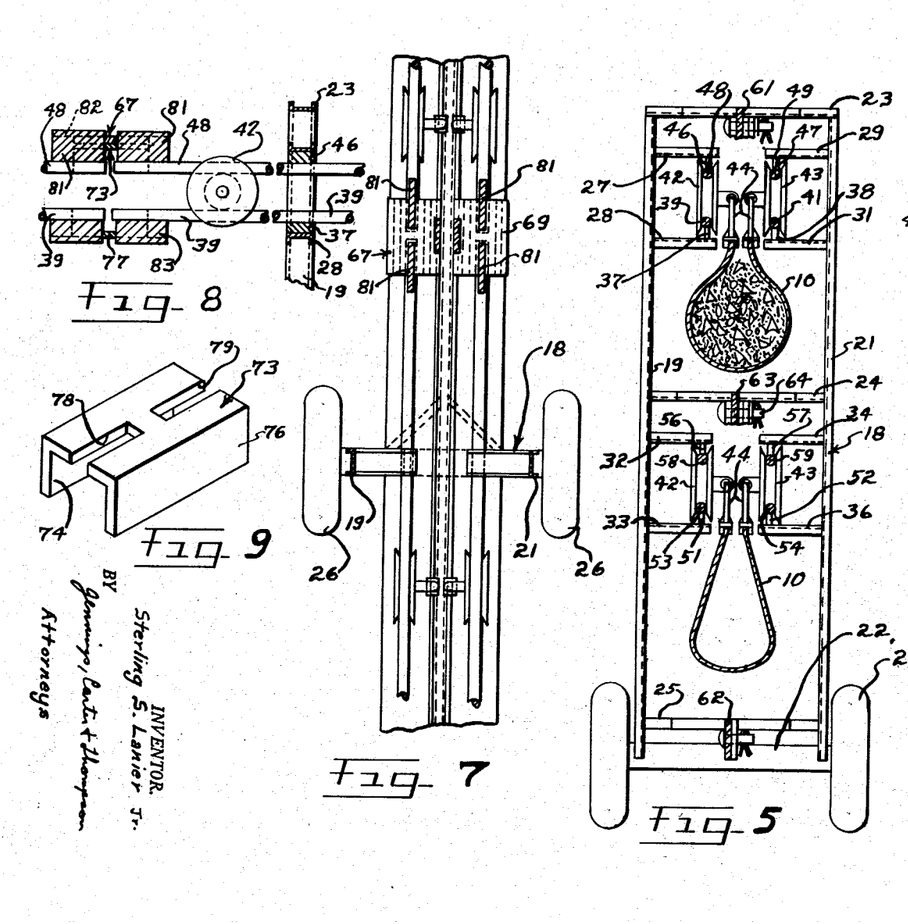
Fig. 5 is a sectional view taken generally along the line V—V of Fig. 3.
Fig. 7 is a sectional view taken generally along the line VII—VII of Fig. 6.
Fig. 8 is a detail sectional view taken generally along the line VIII—VIII of Fig. 6.
Fig. 9 is a perspective view showing the channel-like member of the means adjustably connecting the rail sections.
Figure 6:
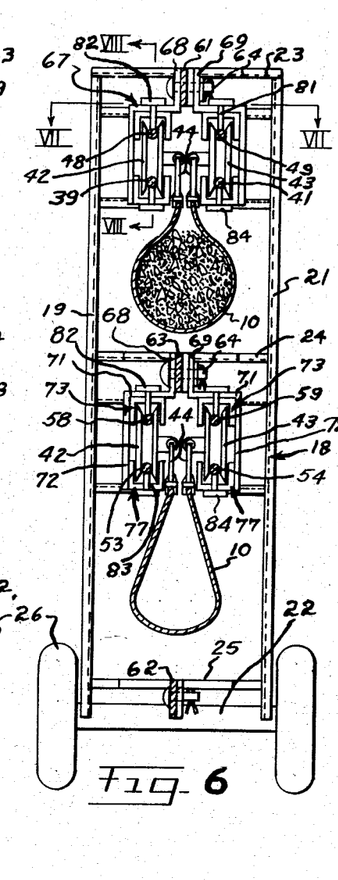
Fig. 6 is a sectional view taken generally along the line VI—VI of Fig. 3.
Figure 19:
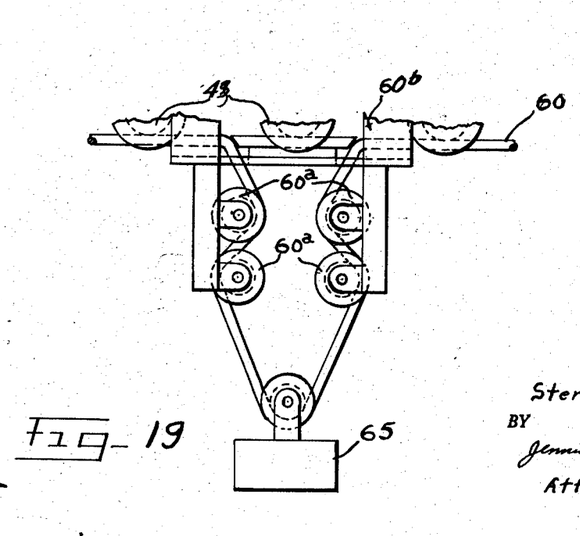
Fig. 19 is a fragmental side elevational view showing means for applying tension to the supporting wire ropes.

Extending inwardly of the upstanding frame members 19 and 21 adjacent the upper ends thereof are pairs of vertically spaced arms 27—28 and 29—31, respectively (see Figs. 5 and 6). In like manner, extending inwardly of the upstanding frame members 19 and 21 beneath the transverse member 24 are vertically spaced arms 32—33 and 34—36, respectively. Supported by the inner ends of the arms 28 and 31 on upstanding brackets 37 and 38 are rail sections 39 and 41, respectively, for supporting sheaves 42 and 43. The sheaves 42 and 43 are pivotally connected to opposite edges of the belt 10 by link members 44. Preferably, the sheaves on opposite sides of the belt are staggered whereby they do not contact each other when the edges of the belt are brought together. Secured to the undersurface of the arms 27 and 29 adjacent the inner ends thereof are depending brackets 46 and 47 which support rails 48 and 49, respectively. As shown in Figs. 5 and 6, the rails 48 and 49 engage the upper portion of the sheaves 42 and 43 whereby the sheaves are prevented from leaving the supporting rails 39 and 41. In like manner, mounted adjacent the inner ends of the arms 33 and 36 are upstanding brackets 51 and 52 which support rail sections 53 and 54. The rail sections 53 and 54 support the sheaves 42 and 43 mounted on the lower or return flight of the conveyor 10. Depending brackets 56 and 57 are supported by the inner ends of the arms 32 and 34 and in turn support rail sections 58 and 59 which engage the upper portion of the sheaves to prevent the same from leaving the supporting rail sections 53 and 54.

Where the rail sections are in the form of wire ropes suitable means may be provided to apply tension to the wire rope, such as the automatic take-up shown in Fig. 19 in which a weight 65 is employed. The rope indicated at 60 passes around a series of pulleys 60a positioned between the mobile units 18 and is supported by suitable frame members 60b which in turn are supported by the mobile frame units 18 whereby weight 65 exerts a downward pull on the rope and thereby stresses same.

Adjacent support units 18 are connected by upper, lower and intermediate draw bars 61, 62 and 63, respectively. Each draw bar is formed of flexible material which permits bending in a horizontal plane whereby the supporting units 18 follow each other as they pass around curves in either direction. As shown in Figs. 3 and 6, the draw bars of adjacent supporting units 18 are pivotally connected to each other by means of pivot pins 64. In actual practice, I have found that the apparatus works satisfactorily where only every other one of the adjacent draw bars are pivotally connected, the others being rigidly connected to each other. The adjacent ends of the draw bars overlap, as shown, and longitudinally extending slots 66 are provided in the draw bars for receiving the pivot pins 64 whereby a limited amount of movement is allowed between the adjoining draw bars to compensate for vertical changes of direction in travel. In order to compensate for slack in the belt, two openings 66 are spaced longitudinally adjacent the ends of the draw bars.

Also connected to the overlapped ends of the draw bars 61 and 63 are rail engaging frames 67 which connect adjacent ones of the rail sections whereby the rails bend in parallel arcs and the overall length of the rails may be varied to permit conveying around curves. As shown in Fig. 6, each rail engaging section 67 embodies depending plate members 68 and 69 which are positioned outwardly of the adjoining draw bars and are secured in place by means of the pivot pins 64. The plate members 68 and 69 extend outwardly as at 71 and then downwardly as at 72. Secured to the undersurface of the outwardly extending portions 71 are short channel members 73 having depending legs 74 and 76 which extend downwardly alongside the sheaves 42 and 43, as shown. Mounted adjacent the lower ends and inwardly of the downwardly extending portions 72 are short channel members 77 having upstanding legs. The short channel members 73 and 77 are provided with longitudinally extending slots 78 and 79 adjacent opposite ends of the bases thereof. Mounted adjacent the ends of the rail sections 48, 49, 58 and 59 are upstanding fin members 81 which fit slidingly within the slots 78 and 79 of the channel members 73 and are provided with an enlarged portion 82 at the opposite side of the fin from the rail sections to limit relative vertical movement between the fin and the channel. In like manner, the rails 39, 41, 53 and 54 are provided with depending fins 83 which are adapted to ride in the slots 78 and 79 of the short channel member 77. Enlarged portions 84 are provided at the lower ends of the fins 83 to limit vertical movement thereof. With the rail sections thus connected to each other, the rail at the outer side of the belt can be lengthened while the rail at the inner side of the belt is shortened to convey around a curve. The ends of the rail sections carrying the fin members thus shift relative to the short channel members 73 and 77 while the sheaves are held in position by the flanges 74 and 76.

In view of the fact that the head and tail terminals 11 and 12 are substantially identical in construction, only a detailed description of the head terminal is deemed necessary. The head terminal 11 comprises a suitable superstructure indicated generally at 86 which is mounted on the track supported vehicle 13. Mounted for rotation in suitable bearings 87 and 88 on the superstructure 86 is a shaft 89 which is propelled by a suitable motor 91. Mounted on the shaft 89 inwardly of the bearings 87 and 88 are sprocket wheels 92 and 93 which are adapted to engage the links 44 which connect the edges of the belt to the sheaves 42 and 43 whereby the belt is propelled. Mounted on the superstructure 86 outwardly of the sprocket wheels 92 and 93 are semi-circular channel like members 96 and 97 with the legs thereof facing each other, as shown, and having inwardly extending flanges 98 and 99 which are spaced from each other a distance to permit free movement of the links 44. Secured to the legs of the semi-circular channels 96 and 97 and extending inwardly thereof are supporting brackets 101 and 102 for supporting semi-circular rail sections 103 and 104, respectively, whereby the pulleys are directed around the head terminal.

Figure 10:
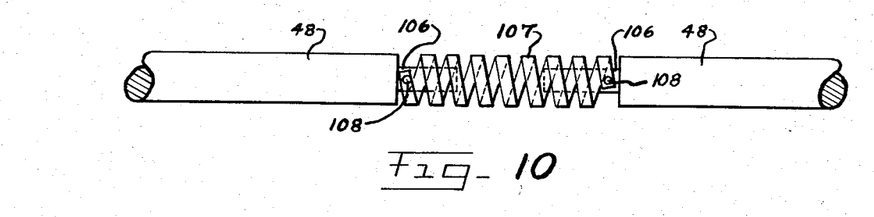
Fig. 10 is a detail of a modified form of connector for adjacent rail sections.

In Fig. 10 of the drawing, I show another means for adjusting the overall length of the rail sections. Two adjoining rail sections, such as rail sections 48 are provided with reduced diameter portions 106 for receiving opposite ends of a spiral spring 107. The ends of the spiral spring 107 are secured to the reduced diameter portions 106 by means of pins 108 whereby the rail sections are resiliently held in spaced relation to each other, thus permitting the overall length of either rail to be varied by varying the tension applied thereto.

Figure 11:
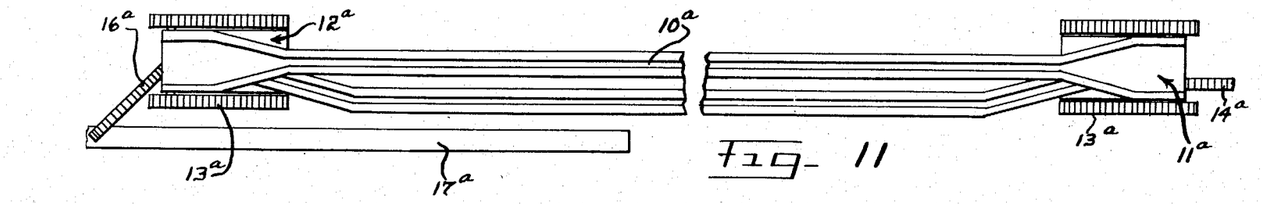
Fig. 11 is a diagrammatic plan view showing a modified form of apparatus in which the conveying and return flights extend alongside each other in substantially the same horizontal plane.
Figure 12:
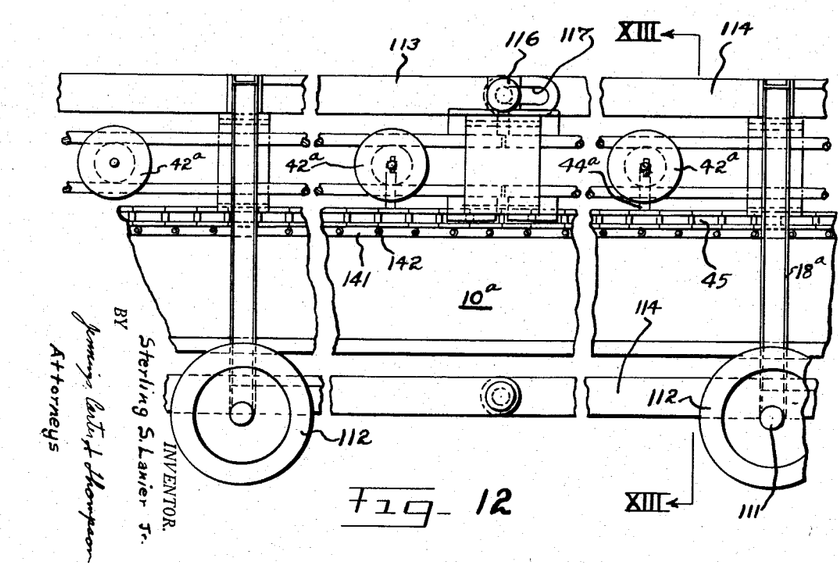
Fig. 12 is a fragmental, side elevational view of the apparatus shown in Fig. 11 and taken generally along the line XII—XII of Fig. 13.
Figure 13:
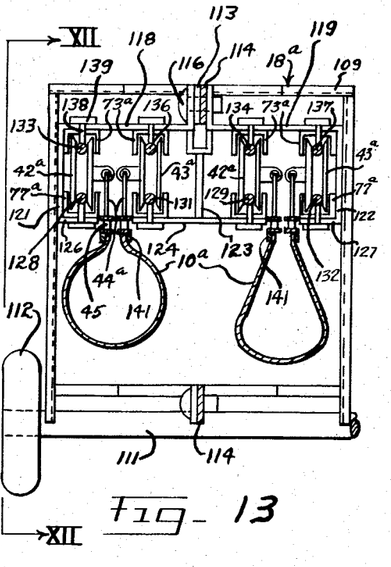
Fig. 13 is a sectional view taken generally along the line XIII—XIII of Fig. 12.

Referring now to Figs. 11 through 13 of the drawings, I show conveying apparatus in which the conveying and return flights of the conveyor extend alongside each other in substantially the same horizontal plane. The apparatus comprises head and tail terminals 11a and 12a. The head terminal 11a is provided with a loader 14a and the tail terminal is provided with a short conveyor 16a which conveys the material onto a main belt 17a. Both head and tail terminals 11a and 12a are mounted on track supported vehicles 13a whereby the conveyor may be moved from place to place. The head and tail terminals 11a and 12a are substantially identical to the terminals 11 and 12, the principal difference being that the return flight is deflected laterally of the conveying flight after passing around the tail terminal 12a and is deflected laterally beneath the head terminal prior to passing around the same. Positioned at intervals along the endless conveyor belt indicated generally at 10a are mobile supporting units 18a which comprise substantially rectangular frames 109 mounted on axles 111. Mounted at the ends of the axles outwardly of the frame 109 are supporting wheels 112. Links 44a connect the sheaves 42a and 43a to sprocket chains 45 which in turn are connected to the edges of the belt 10a. The sprocket chains 45 engage suitable sprockets carried by the head and tail terminals 11a and 12a.

Adjacent supporting frames are connected to each other by means of draw bars 113 and 114 which are substantially identical in construction to the draw bars 61, 62 and 63. The overlapped ends of the draw bars 113 are connected to each other by means of a pivot pin 116. Also, longitudinally extending slots 117 are provided adjacent the ends of the adjoining draw bars 113 for receiving the pins 116 whereby a limited amount of vertical movement is provided between the adjoining draw bars. The draw bars 113 and 114 are formed of a flexible material which permits bending in a horizontal plane thus permitting the supporting units 18a to follow each other as the conveyor travels around curves.

Connected to the pivot pin 116 outwardly of the overlapped ends of the draw bar 113 are supporting straps 118 and 119 having depending legs 121 and 122 which are positioned outwardly of the outermost sheaves 42a and 43a. Mounted on the undersurface of the supporting straps 118 and 119 are short channel members 73a which are identical in construction to the short channel members 73. Secured to the supporting straps 118 and 119 beneath the pivot pin 116 is a substantially vertical support member 123 which carries a horizontal cross member 124 adjacent the lower end thereof. The depending legs 121 and 122 have inwardly extending flanges 126 and 127 at the lower ends thereof, as shown in Fig. 13. Mounted on the inturned flanges 126 and 127 and adjacent the outer ends of the horizontal cross piece 124 are laterally spaced channel members 77a which are also substantially identical to the short channel members 73 and 77, the only difference being that the legs thereof are turned upwardly to receive the lower portions of the sheaves 42a and 43a. The sheaves 42a are supported by rail sections 128 and 129 and the sheaves 43a are supported by rail sections 131 and 132. Also, the sheaves 42a are held in position on the supporting rail sections by means of upper rail sections 133 and 134 while the sheaves 43a are held in place by means of upper rail sections 136 and 137. The rail sections 128, 129, 131, 132, 133, 134, 136 and 137 are each secured to vertical fin members 138 which are identical to the fins 81 and 83 and cooperate with the short channel members to permit longitudinal adjustment of the overall length of the rails, as described heretofore. Vertical movement of the fins 138 relative to the short channels is limited by an enlarged portion 139 provided on the edge of the fin opposite the rail section.

Mounted on the edges of the belt 10a are longitudinally extending straps 141 which are pivotally connected to each other by means of suitable pins 142 whereby the straps may pivot in a vertical plane relative to each other. The straps 141 not only add strength to the belt but cause the belt to travel in an arc as it passes between the supporting units 18a. Where the belt is formed of a material having sufficient stiffness to travel in an arc as it passes around a curve, the straps 141 may be omitted.

Figure 14:
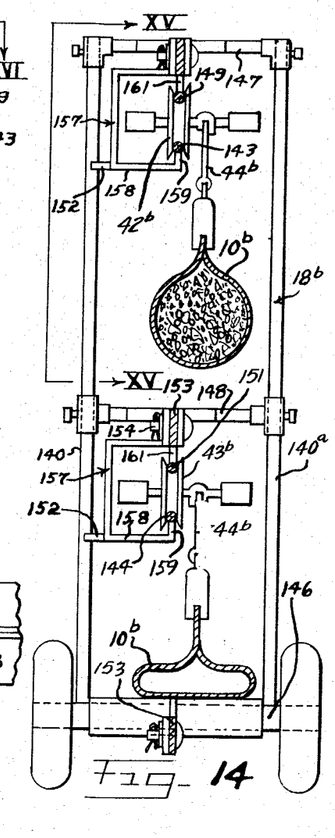
Fig. 14 is a vertical sectional view showing a modified form of conveying apparatus in which the conveying and return flights are each supported by a mono-rail.
Figures 15, 16:
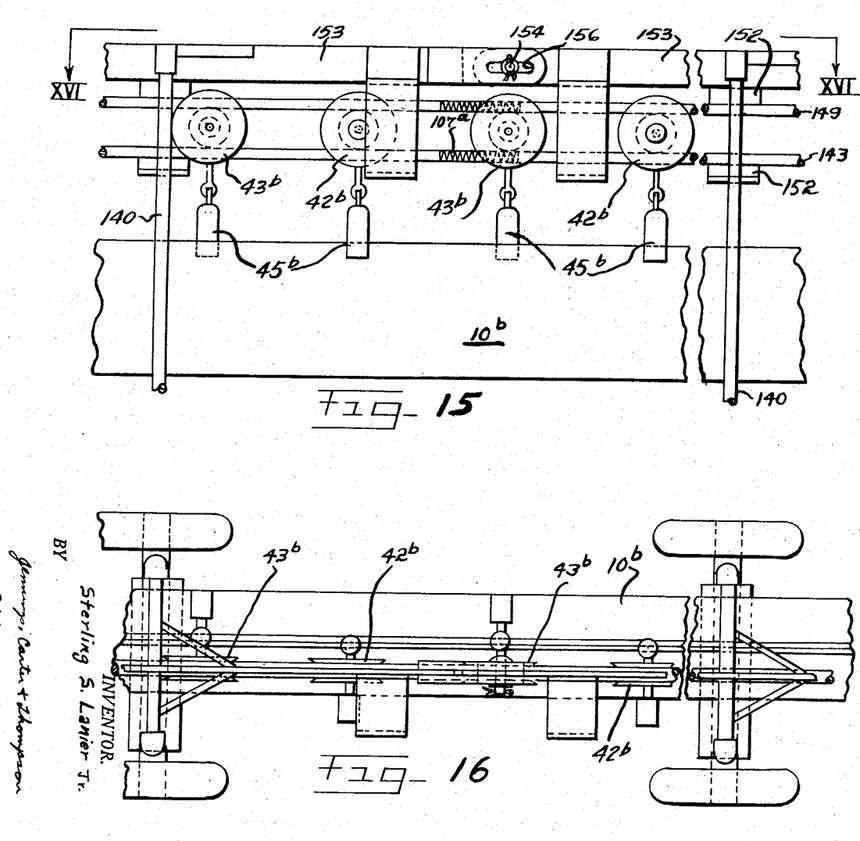
Fig. 15 is a fragmental side elevational view taken generally along the line XV—XV of Fig. 14.
Fig. 16 is a fragmental plan view taken generally along the line XVI—XVI of Fig. 15.

In Figs. 14 through 18, I show my conveying apparatus associated with a mono-rail whereby the conveying and return flights are each supported by a single rail which extends between the head and tail terminals. The endless conveyor belt indicated at 10b is supported at intervals by alternately spaced sheaves 42b and 43b which are secured to opposite edges of the belt by links 44b. The belt 10b is supported intermediate the head and tail terminals by upper and lower rails 143 and 144, respectively, upon which the sheaves 42b and 43b ride. The rails 143 and 144 are supported at intervals by mobile frame units 18b. As shown in Fig. 14, the mobile frame 18b comprises upstanding side members 140 and 140a supported by a transverse axle 146. A vertically adjustable transverse member 147 connects the upper ends of the side members and a vertically adjustable transverse member 148 connects the side members intermediate the ends thereof. The sheaves 42b and 43b are held in engagement with the rails 143 and 144 by rail sections 149 and 151 which engage the upper portions of the sheaves. The supporting frames 18b are attached to the rails 143, 144, 149 and 151 by suitable brackets 152 which are attached to the side member 140 by any suitable means, such as by welding. Adjacent supporting units 18b are connected to each other by draw bars 153 which are connected to each other by pivot pins 154 which ride in elongated slots 156 provided in the ends of the draw bars. Connected to the draw bars 153 are depending bracket 157 having an inturned flange 158 which terminates in an upwardly extending flange 159. As shown in Fig. 14, the rails 143 and 144 are secured to the upstanding flanges 159, thereby to maintain the rails in a curved position when the apparatus travels around curves. Secured to the undersurface of the draw bars 153 are depending brackets 161 which are secured to the upper surface of the rails 149 and 151 to support the same. Spiral springs 107a are attached to the abutting ends of the rail sections and are similar in construction and operation to the spiral springs 107 whereby the overall length of the rails may be adjusted by merely varying the tension applied to the rails.

As shown in the drawings, the edges of the belt 10b are attached to the sheave wheels 42b and 43b in staggered relationship whereby both edges of the belt hang from one side of the rails 143 or 144, as the case may be. At the head and tail terminals, the edges of the belt are spread apart by means to be described hereinafter, whereby the material to be conveyed may be either loaded onto the conveyor or discharged therefrom. While the material is being conveyed, the belt assumes a substantially circular shape, as shown in Fig. 14.

Figure 4:
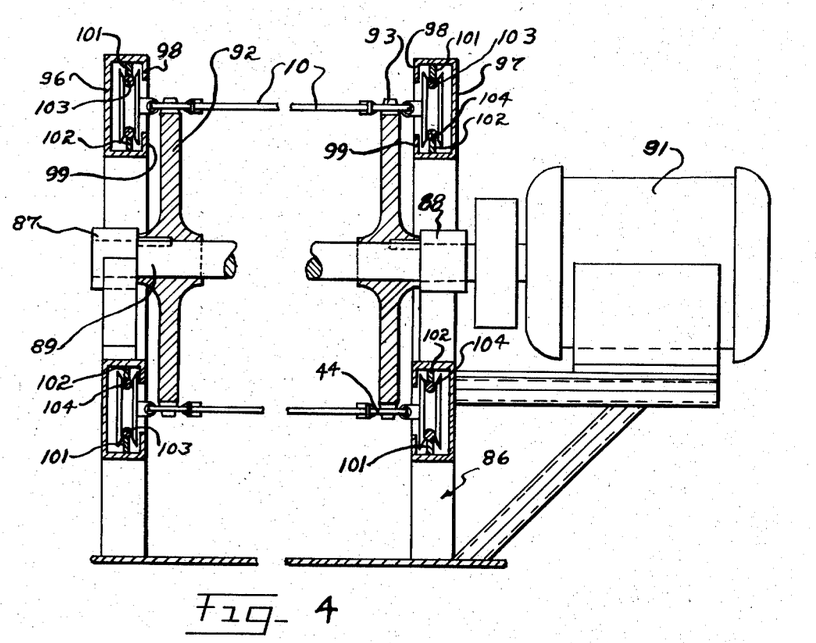
Fig. 4 is a sectional view taken generally along the line IV—IV of Fig. 3.
Figure 17:
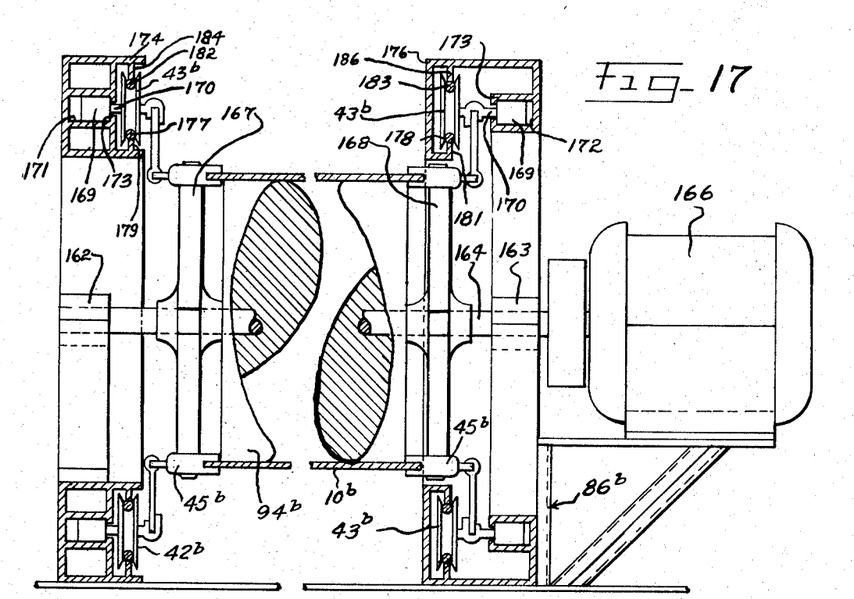
Fig. 17 is a vertical sectional view through one of the terminals of the conveying apparatus shown in Figs. 14 through 16.
Figure 18:
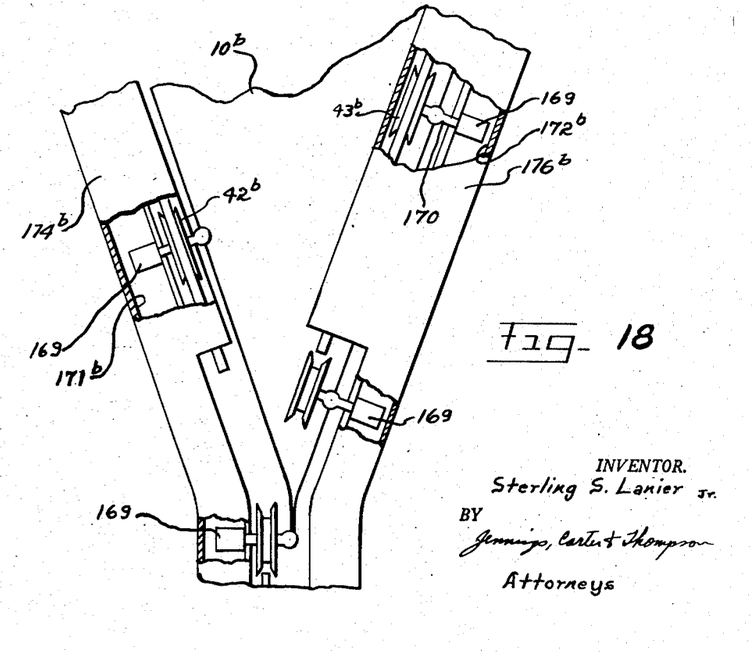
Fig. 18 is a fragmental plan view, partly broken away and in section, showing the means for separating the edges of the conveying belt immediately prior to passing around the head and tail terminals.

Referring now to Fig. 17 of the drawings, the tail and head pulleys for the mono-type rail conveyor comprises a superstructure 86b which is mounted on the track supported frame in the same manner as the superstructure 86, shown in Fig. 4. Mounted in suitable bearings 162 and 163 is a transverse shaft 164 which is driven by a suitable source of power such as a motor 166. Sprocket wheels 167 and 168 are mounted on the shaft 164 and are adapted to engage the brackets 45b at the sides of the belt 10b whereby the same is propelled. A terminal pulley 94b may be mounted on the shaft 164 intermediate the sprocket wheels 167 and 168 to add further support to the belt 10b as it passes around the end terminal or, if desired the pulley 94b may be eliminated and the belt supported only by the sprockets 167 and 168.

Where a mono-rail is employed between the head and tail terminals, it is necessary to provide a two rail system for supporting the belt as it passes around the end terminal. That is, the belt must be opened up by spreading the two edges apart so that material can be placed on the belt or discharged therefrom. To accomplish this, I provide guide rollers 169 which are connected to each sheave by an outwardly projecting arm 170. Semi-circular guideways 171 and 172 are provided at the sides of the end terminals for receiving the guide rolls 169. The guideways 171 and 172 each comprise semi-circular channel-like members with the flanges thereof facing each other. Inwardly extending flanges 173 are provided at the inner ends of the legs of the channel-like members for slidably receiving the arm 170. As shown in Fig. 17, the guide rollers 169 are of a diameter which is greater than the distance between the inturned flanges 173 whereby inward movement of the rollers 169 is limited. Also mounted on the superstructure 86b are semi-circular rail support units 174 and 176. The sheaves 42b and 43b are supported by semi-circular rail sections 177 and 178 respectively which in turn are supported from the members 174 and 176 by inwardly extending brackets 179 and 181. The sheaves 42b and 43b are held in engagement with the circular rail sections 177 and 178 by circular rail sections 182 and 183 which engage the outer portion of the sheaves, as shown. The rail sections 182 and 183 are supported from the members 174 and 176 by inwardly extending brackets 184 and 186. Due to the fact that the two edges of the belt must hang on the same side of the mono-rail for its entire length, the terminal rails and guides therefor are supported whereby the belt on one side passes below the means of support 176 in order to clear the support for the mono-rail on the opposite side of the end terminal.

In order to separate the edges of the belt whereby the sheaves 42b and 43b travel on a two rail system, the support members 174 and 176 are connected to converging guide members 174b and 176b which are substantially identical in construction, as viewed in cross section, as the construction of the guide members 174 and 176. The guide rollers 169 thus engage guideways 171b and 172b prior to reaching the end terminal whereby the edges of the belt are pulled apart upon approaching the end terminal and are then carried around the end terminal by the guideways 171 and 172.

Referring now to Figs. 20 through 23, I show a modified form of my invention in which the endless conveyor belt is in the form of flexible drag members 187 which may be in the form of flexible chains 188 which support transverse drags 189. The flexible chain 188 is in the form of an endless chain which passes around end terminals indicated generally at 11b. The end terminals 11b are mounted on suitable supporting vehicles such as the vehicles for the head and tail terminals 11 and 12 described heretofore.

Mounted between the end terminals of the conveying apparatus are mobile support units 18c comprising transverse axles 191 supported by wheels 192. Mounted on the axles 191 are upstanding support members 193 which support plate-like guide members 194. As clearly shown in Fig. 21, the sides of the plate-like members 194 flare outwardly in the direction of the arrow 196, which is the direction of travel of the drag member 187, the drag member being propelled by any suitable means, not shown. Depending from the axle 191 are support members 197 having Z-shaped members 198 secured to the lower ends thereof. Secured to the Z-shaped members 198 are lower plate-like guide members 199 which also flare outwardly in the direction of travel of the drag member 187, as shown.

Figure 20:
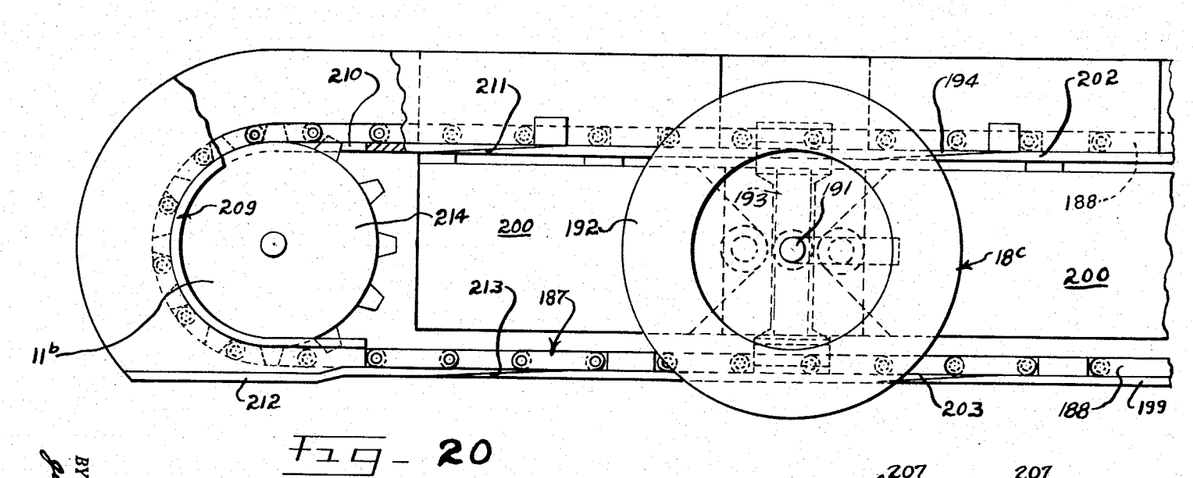
Fig. 20 is a fragmental, side elevational view showing a terminal end of a still further modified form of my invention.
Figure 21:
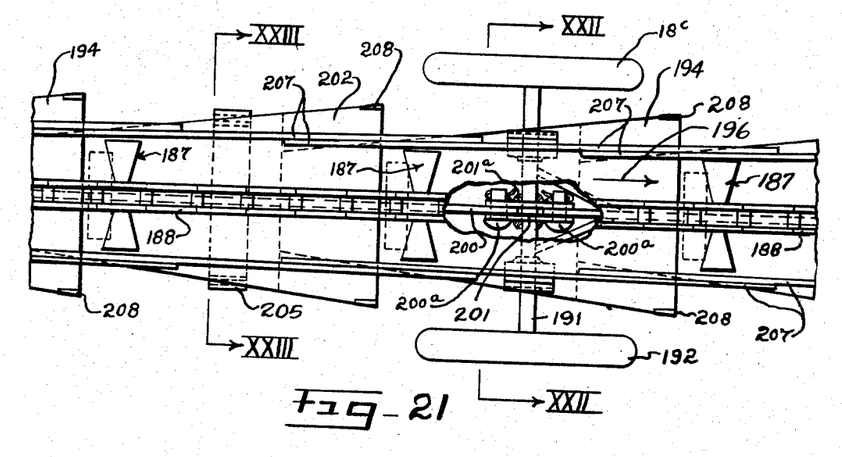
Fig. 21 is a fragmental, plan view of the modification shown in Fig. 20 and removed from the end terminal thereof.
Figure 22:
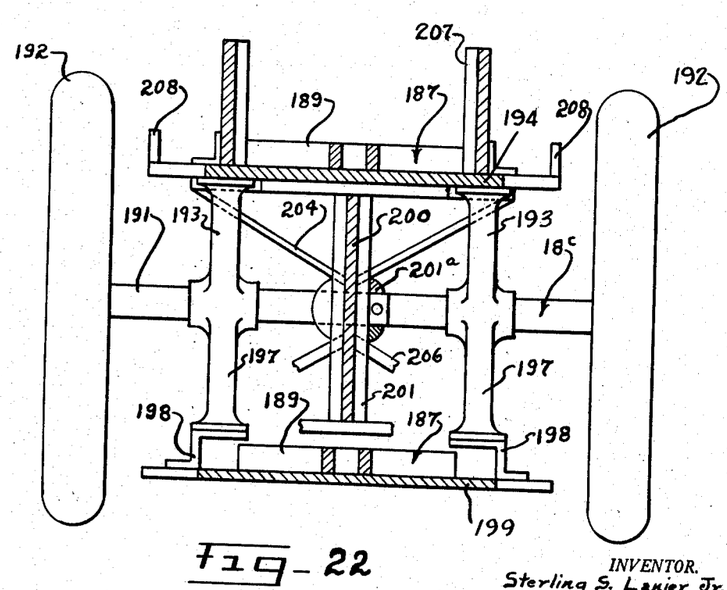
Fig. 22 is a sectional view taken generally along the line XXII—XXII of Fig. 21; and, Fig. 23 is a sectional view taken generally along the line XXIII—XXIII of Fig. 21.
Figure 23:
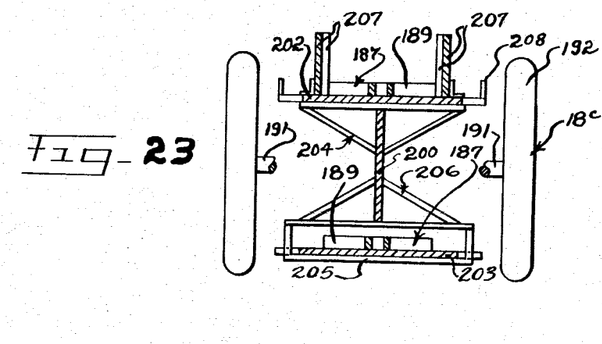

The mobile support units 18c are connected by a continuous flexible draw bar 200 which is pivotally connected by pins 200a to brackets 201. The brackets 201 are secured to the axles 191 by any suitable means, such as by welding at 201a. Secured to the draw-bar 200 intermediate the plate-like members 194, which are supported by the mobile support units 18c, are plate-like members 202 which are substantially identical in construction to the plate-like members 194. In like manner, secured to the draw-bar 200 intermediate the lower plate-like members 199 are plate-like members 203. Suitable support members 204 and 206 connect the draw bar 200 to the upper and lower plate-like members 202 and 203, respectively, as shown in Fig. 23. The support member 206 is provided with a transverse bar 205 which extends beneath the lower plate 203 to support the same. As shown in Fig. 20, the adjoining plate-like members 194—202 and 199—203 are beveled whereby the adjoining plate-like members lie in the same horizontal plane.

Secured to the upper surface of the plate-like members are upstanding, overlapped side members 207 which prevent spillage of the material conveyed by the drags 189. Secured to the forward corners of the plate-like members are upstanding stop members 208 which limit the amount of bend which may be applied to the conveying sections. That is, the upstanding stops 208 engage the sides 207 thus limiting further movement of the plate-like members relative to each other. It will be understood that the draw bar and the side members 207 are formed of a flexible material whereby they may bend in an arc as the conveyor travels around curves.

At the end terminals 11b, semi-circular guide plates 209 are provided. The upper end of the semi-circular plate 209 extends outwardly in a horizontal plane as at 210 and is provided with a beveled edge 211 for engaging an adjacent plate 194, as shown. A horizontal plate 212 is mounted beneath the end terminals 11b, as shown, and is provided with a beveled edge 213 which is in position to overlap an adjacent lower plate member 203. As shown in Fig. 20, the end terminal 11b is provided with suitable sprocket wheels 214 around which the flexible chain 188 passes.

From the foregoing description, it will be apparent that I have devised an improved mobile conveyor which has longitudinal flexibility with automatic means for varying the overall length of the supporting rails, thus permitting the rail to bend around a curve in either direction. By providing flexible rail sections, together with rail engaging means intermediate the supports therefor, the rails assume substantially parallel arcs as the conveyor passes around curves. Also, by providing flexible strips at the edges of the belt, the belt edges do not stretch but bend in an arc. Also, by attaching the sheave wheels in staggered relation to each other along opposite edges of the belt, the two edges may be drawn together without the difficulty of expansion and contraction as the belt bends in an arc around curves. Furthermore, the provision of a mono-rail type conveyor eliminates entirely the problem of compensation for variations in lengths of the supporting rail sections. Also, the modified form of my invention in which plate-like guide members are employed to support the drags is satisfactory in every respect and is very simple of construction and operation.

While I have shown my invention in several forms, it will be obvious to those skilled in the art that it is not so limited, but is susceptible of various other changes and modifications without departing from the spirit thereof, and I desire therefore, that only such limitations shall be placed thereupon as are specifically set forth in the appended claims.

What I claim is:

1. In conveying apparatus including an endless conveyor belt having a head terminal at one end and a tail terminal at the other end thereof around which said belt passes, means for propelling said belt, supporting sheaves separately mounted at intervals on each side of the belt and movable therewith, a plurality of spaced wheeled support units positioned between said head terminal and said tail terminal, flexible draw bars extending between and connecting said wheeled support units to each other whereby said draw bars may be easily bent to position the wheeled support units in arcuate relation, a pair of vertically spaced, continuous flexible guide rails extending between the head terminal and tail terminal over each side of the belt and adapted to receive the sheaves on the side of the belt over which the rails are positioned in supporting relation whereby the rails may be positioned in arcuate relation upon the positioning of the support units in arcuate relation, said support units having a vertically extending frame on which the flexible guide rails are supported between the head terminal and the tail terminal, said guide rails comprising a plurality of guide rail sections connected to each other, and adjustable means connecting adjacent ends of said rail sections whereby the effective length of said guide rails may be varied.

2. A conveyor as defined in claim 1 and further characterized in that said adjustable means is carried by the draw bars adjacent the longitudinal centers thereof thereby holding the rails in parallel relationship when the conveying apparatus travels around curves.

3. A conveyor as defined in claim 1 in which the return flight of the conveyor belt extends laterally of the conveying flight thereof.

4. A conveyor as defined in claim 1 in which the return flight is positioned vertically beneath the conveying flight thereof.

5. A conveyor as defined in claim 1 in which the conveying and return flights are each supported by a single rail.

6. A conveyor as defined in claim 1 in which the edges of the belt are reinforced by longitudinally extending flexible strips of material pivotally connected to each other at each side of said belt.

7. Conveying apparatus as defined in claim 1 in which the adjustable means connecting adjacent ends of the rail sections comprises a spiral spring, the ends of said rail sections being of a diameter to enter an adjacent end of said spiral spring, and means securing the ends of said spiral spring to said rail sections.

8. In conveying apparatus including an endless conveyor belt having a head terminal at one end and a tail terminal at the other end thereof around which said belt passes, means for propelling said belt, supporting sheaves separately mounted at intervals at each side of the belt and movable therewith, a plurality of guide rail sections joined to each other to provide continuous rails between said head terminal and said tail terminal upon which said sheaves are adapted to ride, adjustable means connecting adjacent ends of said rail sections comprising vertical fins secured to the rail sections adjacent the ends thereof, channel guide members carried by said mobile support units with the legs of said guide members disposed along opposite sides of the supporting sheaves, there being elongated openings in the bases of said guide members adapted to receive said fins with a sliding fit, means limiting vertical movement of said fins relative to said guide members, and mobile support units supporting said rail sections.

9. Apparatus as defined in claim 8 in which the means limiting vertical movement of the fins relative to the guide members comprises a horizontal member carried by the end of said fin opposite the rail section and disposed on the opposite side of the base of the guide member from said rail section.

10. In conveying apparatus including an endless conveyor belt having a head terminal at one end and a tail terminal at the other end thereof around which said belt passes, means for propelling said belt, supporting sheaves separately mounted at intervals at each side of the belt and movable therewith, flexible supporting guide rails extending between said head terminals and said tail terminal upon which said sheaves are adapted to ride, wheel supported frames supporting said guide rails at intervals, flexible draw bars connecting adjacent ones of said wheel supported frames whereby the guide rails and wheel frames may be positioned in arcuate relation, and rail engaging means carried by the draw bars adjacent the longitudinal centers thereof holding said rails in parallel relationship when the conveying apparatus travels around curves.

11. In conveying apparatus including an endless conveyor belt having a head terminal at one end and a tail terminal at the other end thereof around which said belt passes, means for propelling said belt, supporting sheaves separately mounted at intervals at each side of the belt and movable therewith, a flexible supporting rail extending between said head terminal and said tail terminal upon which the sheaves of the conveying flight of said belt are adapted to ride, a second flexible supporting rail extending between said head terminal and said tail terminal upon which the sheaves of the return flight of said belt are adapted to ride, guide rails adjacent said head and tail terminals separating and supporting the sheaves positioned at one side of the belt from the sheaves positioned at the opposite side thereof prior to contact with said head and tail terminals, and mobile frames supporting said rails at intervals between said terminals and connected to each other by flexible draw bars whereby said supporting rails and said mobile frames may be positioned in arcuate relation.

12. Conveying apparatus as defined in claim 11 in which the means separating said sheaves comprises substantially semi-circular guide rails at each side of said terminals, and converging guide rails connecting said semi-circular guide rails to the supporting rails extending between the head and tail terminals.

13. In conveying apparatus including an endless conveyor belt having a head terminal at one end and a tail terminal at the other end thereof around which said belt passes, means for propelling said belt, supporting sheaves separately mounted at intervals at each side of the belt and movable therewith, a single supporting rail extending between said head terminal and said tail terminal upon which the sheaves of the conveying flight of said belt are adapted to ride, a second supporting rail extending between said head terminal and said tail terminal upon which the sheaves of the return flight of said belt are adapted to ride, mobile frames supporting said rails at intervals between said terminals, substantially semi-circular guide rails at each side of said terminals, converging guide rails connecting said semi-circular guide rails to the supporting rails, outwardly projecting guide members carried by said belt, and other guide members extending substantially parallel to said semi-circular rails and said converging rails and adapted to cooperate with the first mentioned guide members whereby the sheaves at opposite sides of the belt move outwardly toward their associated converging and semi-circular guide rails as the sheaves approach the head and tail terminals.

14. Conveying apparatus as defined in claim 13 in which the outwardly projecting guide members are rollers and said other guide members comprise channel-like members having the legs thereof turned inwardly to receive said rollers, and inturned flanges at the inner ends of said legs limiting inward movement of said rollers relative to said channel-like members.

(References on following page)

References Cited in the file of this patent

UNITED STATES PATENTS

| | | |
|---|---|---|
| 422,139 | Maxon | Feb. 25, 1890 |
| 1,442,219 | Howe et al. | Jan. 16, 1923 |
| 1,548,278 | Phillips et al. | Aug. 4, 1925 |
| 1,559,772 | Peale | Nov. 3, 1925 |
| 1,826,853 | Williams et al. | Oct. 13, 1931 |
| 1,933,404 | Allen et al. | Oct. 31, 1933 |
| 2,250,933 | Manierre | July 29, 1941 |
| 2,818,965 | Horth | Jan. 7, 1958 |

FOREIGN PATENTS

| | | |
|---|---|---|
| 63,248 | France | Mar. 30, 1955 |
| 746,793 | Great Britain | Mar. 21, 1956 |
| 1,096,620 | France | Feb. 2, 1955 |